United States Patent [19]

Sparks

[11] 4,350,134
[45] Sep. 21, 1982

[54] METHOD AND APPARATUS FOR PRODUCING AN AIR/FUEL VAPOR MIXTURE

[76] Inventor: William D. Sparks, 2657 Gary Way, Sacramento, Calif. 95815

[21] Appl. No.: 137,760

[22] Filed: Apr. 7, 1980

[51] Int. Cl.³ .............................................. F02M 31/00
[52] U.S. Cl. ..................................... 123/557; 261/144; 123/549; 123/554; 123/555
[58] Field of Search ............... 123/557, 558, 523, 549, 123/554, 555; 48/180 R, 180 H; 261/144, 145, DIG. 55, 142, 139

[56] References Cited

U.S. PATENT DOCUMENTS

| | | | |
|---|---|---|---|
| 776,982 | 12/1904 | Anderson | 123/555 |
| 1,603,660 | 10/1926 | Cassella | 123/557 |
| 1,637,104 | 7/1927 | Crone | 261/142 |
| 1,980,496 | 11/1934 | Musselwhite | 123/557 |
| 2,219,522 | 10/1940 | Hinsch | 123/558 |
| 2,355,693 | 8/1944 | Aldrich | 123/557 |
| 3,886,919 | 6/1975 | Freeman | 123/557 |
| 4,050,419 | 9/1977 | Harpman | 261/145 |
| 4,106,457 | 8/1978 | Totten | 123/557 |
| 4,112,889 | 9/1978 | Harpman | 123/557 |

FOREIGN PATENT DOCUMENTS 342784  9/1918  Fed. Rep. of Germany ...... 123/555

*Primary Examiner*—Ronald H. Lazarus
*Attorney, Agent, or Firm*—Blair, Brown & Kreten

[57] ABSTRACT

A method and apparatus for producing an air/fuel vapor mixture for use in the combustion chambers of an internal combustion chamber which includes an enclosure into which ambient air is introduced with a heater for heating the ambient air together with a fuel vaporizer for vaporizing fuel injected into the enclosure and for mixing with the heated air and another heater for heating the resulting air/fuel vapor mixture which is subsequently conducted out of the enclosure to the combustion chambers of the internal combustion engine.

10 Claims, 1 Drawing Figure

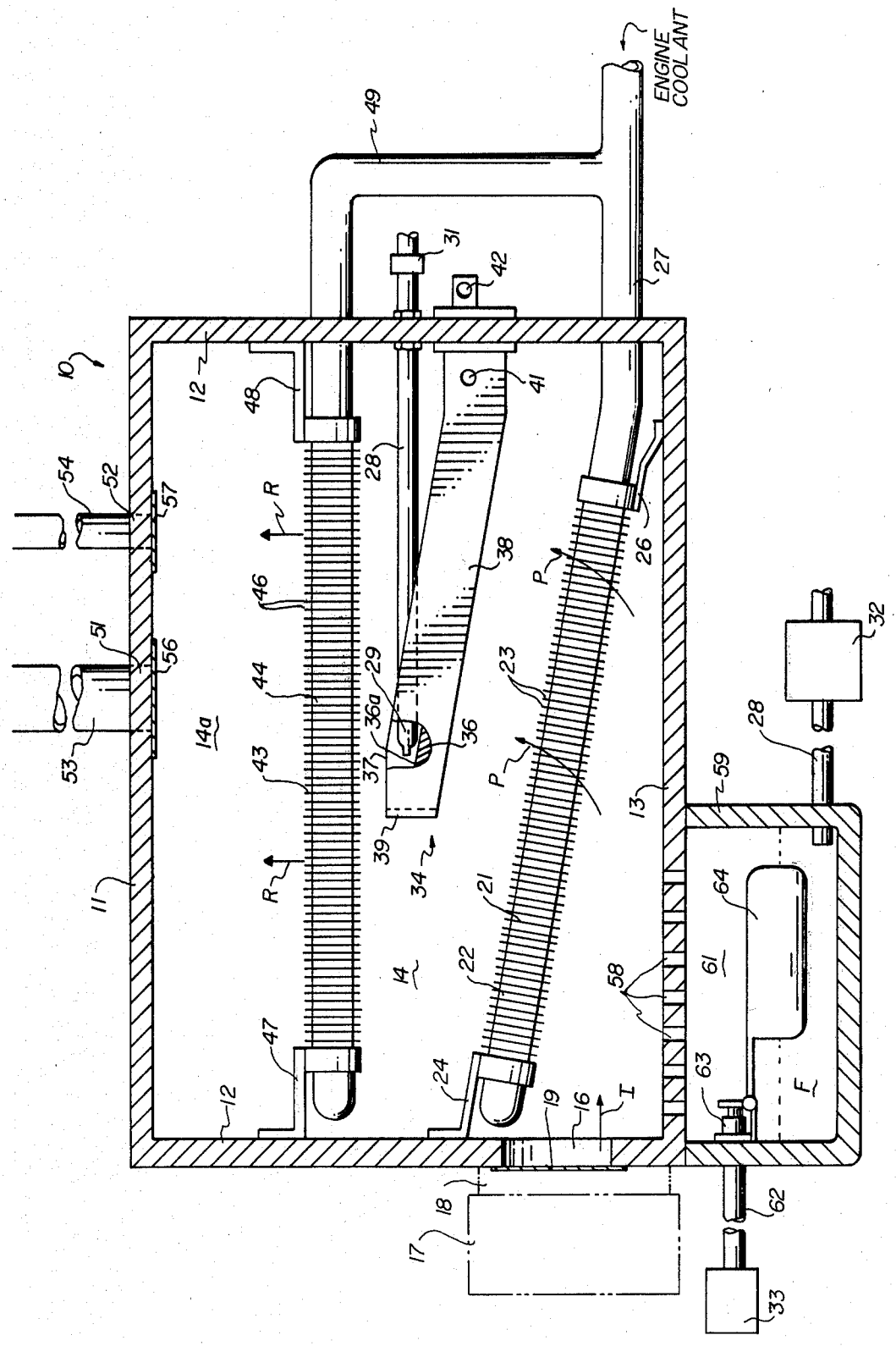

METHOD AND APPARATUS FOR PRODUCING AN AIR/FUEL VAPOR MIXTURE

BACKGROUND OF THE INVENTION

The supply of fuel such as gasoline to an internal combustion engine incorporated in automobiles is generally accomplished by means of a carburetor in which air and fuel is mixed and atomized for subsequent introduction into the combustion chambers of the engine. By supplying fuel in such an atomized or vaporized form, greater fuel control and efficiency of combustion is obtained. Combustion efficiency where petroleum products such as gasoline are utilized for power has received ever increasing concern under present day energy conservation practices brought about by rapidly increasing fuel costs and the unreliability of foreign petroleum sources. One step which has been proposed to increase the combustion efficiency in internal combustion engines has been the utilization of the engine exhaust gases for heating the air/fuel mixture thereby providing the air/fuel mixture to the engine at a higher temperature for improved efficiency. However, such an approach has not been readily accepted in that with the use of the engine exhaust gases for heating, temperature control of the mixture is limited and there is always the danger of overheating with attendent preignition of the fuel. Furthermore, as the typical carburetor is a rather complex and delicate device, it is subject to frequent breakdown and maladjustment as well as requiring frequent maintenance both for cleaning and repair.

OBJECTS AND SUMMARY OF THE INVENTION

Accordingly, a primary object of this invention is to provide a new and novel apparatus for producing a mixture of air/fuel in a pure vapor state for use in the combustion chambers of an internal combustion engine.

Another object of this invention is to provide a new and novel apparatus for producing an air/fuel vapor mixture for an internal combustion engine which increases the combustion efficiency in the engine with attendant increase in engine power and decrease in gasoline consumption.

Still another object of this invention is to provide a new and novel apparatus for producing an air/fuel vapor mixture for an internal combustion engine which is extremely simple and inexpensive in construction and which may be easily installed in an automobile having an internal combustion engine.

A still further object of this invention is to provide a new and novel method and apparatus for producing a vaporous mixture of air and fuel for an internal combustion engine in an automobile or the like which eliminates total reliance on a conventional carburetor and it's attendant adjustment and maintenance problems and which produces complete combustion of the fuel in the engine so as to substantially eliminate the contaminants and pollutants commonly found in the exhaust gases of the engine.

The objects of the invention and other related objects are accomplished by the provision of an enclosure having air inlet means for introducing ambient air into the enclosure interior with air heating means disposed within the enclosure interior for heating the ambient air. Means are provided for injecting liquid fuel into the enclosure interior onto fuel vaporization means disposed in the enclosure interior above the air heating means so as to vaporize the liquid fuel and for mixing the vaporized fuel with the heated ambient air. Heating means are also provided in the enclosure interior above the fuel vaporization means for heating the air/fuel vapor mixture and outlet means are provided on the enclosure for conducting this heated air/fuel vapor mixture out of the enclosure interior to a remotely located combustion zone for engine combustion.

Other objects and advantages of the invention will become apparent in the light of the following specification taken in connection with the accompanying drawings.

BRIEF DESCRIPTION OF THE DRAWING

The single FIGURE of the drawing is a sectional view illustrating the apparatus of the invention by means of which the method of the invention is practiced.

DESCRIPTION OF THE PREFERRED EMBODIMENT

Referring now to the single FIGURE of the drawing, there is shown an apparatus constructed in accordance with the invention which includes an enclosure designated generally by the numeral 10 having a top wall 11, side walls 12 and a bottom wall 13 defining an interior 14. Air inlet means are provided on one of the enclosure walls such as side wall 12 which in the illustrated embodiment, includes an opening 16 in side wall 12 for introducing ambient air into the enclosure interior 14 in the direction of the arrow I. Preferably, an air filter 17 of conventional construction is suitably mounted on the side wall 12 adjacent the opening 16 by suitable means such as a tubular bracket 18 for filtering ambient air flowing into the enclosure in the direction of the arrow I. Preferably, a screen 19 of fine copper mesh is disposed over the opening 16 to prevent ignition of fuel within the enclosure interior 14 by an engine backfire or similar occurrence.

Air heating means are also disposed within the enclosure interior 14 for heating the ambient air introduced into the interior. More specifically, a first heat exchanger 21 of conventional construction including a plurality of tubes 22 having fins 23 mounted thereon in a conventional manner is mounted within the enclosure interior 14 by suitable means such as brackets 24, 26. A heat transfer medium is introduced into the heat exchanger 21 for heating the ambient air flowing over the heat exchanger 21 in the direction of the arrows P. More specifically, the heat exchanger 21 is connected by means of a conduit 27 in communication with the engine coolant such as water flowing within the block of the internal combustion engine (not shown) with which the apparatus of the invention is associated. The heated engine coolant flowing within the heat exchanger 21 transfers heat to the ambient air as it flows upwardly in the direction of the arrows P.

Means are provided for injecting liquid fuel such as gasoline into the enclosure 14. More specifically, fuel conduit means such as a tube 28 extends through the enclosure side wall 12 and projects into the enclosure interior 14. The end of the tube 28 disposed within the enclosure interior 14 is provided with a spray nozzle 29 for spraying liquid fuel into the enclosure interior 14. Preferably, the spray nozzle has an orifice of approximately 0.03 inches in diameter. The fuel conduit means or tube 28 is also provided with a pressure regulator 31 and a pump 32 preferably an electric pump by means of which fuel from an associated fuel supply such as the fuel tank 33 of the automobile with which the apparatus of the invention is associated is supplied to the nozzle 29.

The apparatus of the invention also includes fuel vaporization means which, in the illustrated embodiment, comprises an electric heater suitably mounted on the enclosure and designated generally by the numeral 34. In the illustrated embodiment, the electric heater 34 includes a substantially planar heating element 36 having a heating surface 36a disposed in underlying relationship with spray nozzle 29 and inclined downwardly to the right as viewed in the single FIGURE of the drawing. The heating element 36 is provided with side plates 37, 38 and a front plate 39 suitably secured thereto by bracing or the like to the sides and ends respectively of the heating element 36. Thus, the fuel sprayed from the nozzle 29 onto the heating element 36 flows downwardly along the surface 36a of the heating element 36 and is vaporized as it is heated by the heating element 36. The side plates 37, 38 are also provided with openings 41 through which the unvaporized fuel flows therethrough downwardly towards the bottom wall 13 of the enclosure 10. The heating element 36 is arranged to be connected to an associated source of electric power (not shown) by suitable means such as terminal 42.

As the heated ambient air flows upwardly within the enclosure interior 14 in the direction of the arrows P, the fuel vapor produced by the heating element 36 mixes with the heated ambient air to provide a heated air/fuel mixture which continues to flow upwardly within the enclosure interior 14.

The apparatus of the invention also includes heating means disposed within the enclosure interior 14 which, in the illustrated embodiment, includes a second heat exchanger 43 having a plurality of tubes 44 on which fins 46 are mounted in the conventional manner and the heat exchanger 43 is suitably mounted by means of brackets 47, 48 above the spray nozzle 29 and the fuel vaporization means 34. A heat transfer medium is also supplied to the heat exchanger 43 which, in the preferred embodiment, comprises engine coolant which is supplied to the heat exchanger 43 by means of a branch conduit 49 for communicating conduit 27 with the tubes within the heat exchanger 43. Thus, as the air/fuel vapor mixture flows upwardly in the direction of the arrows R through the heat exchanger 43, the mixture is further heated to the desired temperature level and enters the upper portion of the enclosure interior indicated by the referene numeral 14a and conveniently referred to as a "holding chamber".

Outlet means are provided on the enclosure for conducting the heated air/fuel vapor mixture from the enclosure interior or holding chamber 14a to a remotely located combustion zone (not shown) for engine combustion. More specifically, at least one, preferably two, openings 51, 52 are provided within the enclosure top wall 11 which communicate through hoses 53, 54 respectively with the intake manifold of the internal combustion engine for subsequent introduction into the engine combustion chambers. Both hoses 53, 54 are preferably insulated, hose 53 communicating with the engine intake manifold through a control valve (not shown) located under the carburetor for low engine RPM. Hose 54 communicates through a low speed valve control (not shown) through the carburetor butterfly valve used for the high engine RPM intake control. The carburetor may be modified so that it has no accelerator pump and the fuel can be shut off to the carburetor by means of an electrically operated solenoid disposed within the engine fuel line. Preferably, screens 56, 57 of fine copper mesh are disposed on the enclosure over the openings 51, 52 respectively for the same purpose as the screen 19 over the air inlet opening 16.

Means are provided for returning the unvaporized fuel from the fuel vaporization means or electric heater 34 which flows out of the ports 41. More specifically, the bottom wall 13 of the enclosure 10 is provided with at least one, preferably a plurality, of openings 58 which are arranged to communicate the enclosure interior 14 with a sump 59 mounted on the underside of the enclosure bottom wall 13 as shown. The sump 59 has an interior 61 in which fuel F is contained, fuel being supplied to the sump interior 61 through a conduit 62 connected to the fuel tank 33. The sump interior 61 also communicates with the fuel supply line 28 so that the fuel F in the sump interior 61 is pumped out of the interior 61 to the spray nozzle 29 through the fuel line 28 by means of pump 32. Preferably, the fuel level in the sump interior 61 is maintained at a predetermined level by means of a float valve 63 on the conduit 62, the opening and closing of which is controlled by a float 64. Therefore, as fuel flows out of the ports 41 downwardly it flows along the bottom wall 13 of the enclosure 10 through the openings 58 into the sump 59 and is added to the fuel F in the sump 59 from the fuel tank 33 to be subsequently sprayed through the spray nozzle 29 in the enclosure interior 14.

It should be understood that the temperature of the heating element 36 is maintained at a predetermined level adequate to produce proper vaporization of the fuel but still well below the flash point of the fuel vapor. It should be understood also that the screens 19, 56 and 57 act like mantles in a gas lantern and, as referred to above, prevent the mixture of fuel vapor and air from being ignited within the enclosure interior 14. Such copper screens are also used at the carburetor where the air enters from the insulated hoses 53, 54 for safety purposes in the event of an engine backfire.

Having thus described the preferred embodiment of the invention it should be understood that numerous structural modifications and adaptations may be resorted to without departing from the spirit of the invention.

What is claimed is:

1. Apparatus for producing an air/fuel vapor mixture for an internal combustion engine or the like comprising, in combination, an enclosure having a side wall, a top wall and a bottom wall defining an interior, air inlet means on one of said enclosure walls for introducing ambient air into said enclosure interior, air heating means disposed within said enclosure interior for heating said ambient air, means for injecting liquid fuel into said enclosure interior, fuel vaporization means distinct from said air heating means disposed in said enclosure interior above said air heating means for vaporizing said injected fuel to provide a mxiture of vaporized fuel and additional heated ambient air, heating means disposed in said enclosure interior above said fuel vaporization means for heating said air/fuel vapor mixture and outlet means in one of said enclosure walls for conducting said heated air/fuel vapor mixture from said enclosure interior to a remotely located combustion zone for engine combustion.

2. An apparatus in accordance with claim 1 wherein said air/fuel vapor mixture heating means is disposed in spaced relationship with said enclosure top wall to define a holding chamber for said mixture wherein said outlet means are disposed on said enclosure top wall in communication with said holding chamber.

3. An apparatus in accordance with claim 2 wherein air heating means comprises a first heat exchanger mounted on said enclosure within said interior and first conduit means for circulating coolant from said internal combustion engine through said first heat exchanger for heating said ambient air and wherein said mixture heating means comprises a second heat exchanger mounted on said enclosure within said interior and second conduit means for circulating coolant from said internal combustion engine through said second heat exchanger for heating said air/fuel vapor mixture.

4. An apparatus in accordance with claim 3 wherein said means for injecting fuel into said enclosure interior comprises fuel conduit means for conducting fuel from an associated source of liquid fuel into said enclosure interior, said fuel conduit means including a spray nozzle disposed within said enclosure interior for spraying said liquid fuel onto said fuel vaporization means.

5. An apparatus in accordance with claim 4 wherein said fuel vaporization means comprises an electric heater having a heating surface, said heater being mounted on said enclosure within said interior adjacent said spray nozzle and means for connecting said heater to an associated source of electric power.

6. An apparatus in accordance with claim 5 including means for returning unvaporized liquid fuel from said fuel vaporization means to said fuel conduit means.

7. An apparatus in accordance with claim 6 wherein said fuel returning means includes a sump disposed in underlying relationship with said enclosure bottom wall, said sump having an interior communicating with said fuel conduit means, means for communicating said sump interior with said associated source of liquid fuel and wherein said enclosure bottom wall is provided with at least one opening for draining said unvaporized liquid fuel collected in said enclosure interior to said sump for returning said unvaporized liquid fuel from said fuel vaporization means to said fuel conduit means.

8. An apparatus in accordance with claim 7 wherein said means for communicating said sump interior with said associated source of liquid fuel includes a float valve for maintaining a predetermined level of fuel in said sump interior.

9. The apparatus in accordance with claim 8 wherein said means for returning unvaporized liquid fuel from said fuel vaporization means to said fuel conduit means and said fuel vaporization means includes a heating surface underlying said nozzle and a portion of its associated said fuel conduit disposed within said interior, upwardly extending front and side plates eminating up from said heating surface thereby defining an open topped trough, and an opening on one said plate for bleeding excess fuel from said trough to said sump.

10. The apparatus in accordance with claim 9 wherein said trough is angled from a high area near said nozzle to a low area near said opening disposed on said side plate whereby fuel trickles down said trough and is vaporized and a greater heating surface area is provided.

* * * * *